(12) United States Patent
Velhner et al.

(10) Patent No.: US 7,215,100 B2
(45) Date of Patent: May 8, 2007

(54) GENERATOR TRANSIENT REGULATOR

(75) Inventors: Aleks Velhner, Richmond (CA); Neil Garfield Allyn, Vancouver (CA); Terry Moreau, West Vancouver (CA)

(73) Assignee: Teleflex Canada Inc., Richmond (CA)

( * ) Notice: Subject to any disclaimer, the term of this patent is extended or adjusted under 35 U.S.C. 154(b) by 0 days.

(21) Appl. No.: 11/083,923

(22) Filed: Mar. 21, 2005

(65) Prior Publication Data
US 2006/0208710 A1    Sep. 21, 2006

(51) Int. Cl.
H02P 9/10 (2006.01)
H02P 11/00 (2006.01)
H02P 9/00 (2006.01)
H02H 7/06 (2006.01)

(52) U.S. Cl. .......................... 322/59; 322/25; 322/28; 322/44

(58) Field of Classification Search .................. 322/59, 322/44, 46, 61, 89, 25, 28
See application file for complete search history.

(56) References Cited

U.S. PATENT DOCUMENTS

| | | | | |
|---|---|---|---|---|
| 4,827,393 A * | 5/1989 | Clark | ........................... | 363/79 |
| 5,017,857 A * | 5/1991 | Fox | ............... | 322/25 |
| 5,850,138 A | 12/1998 | Adams et al. | | |
| 6,144,190 A * | 11/2000 | Scott et al. | ..................... | 322/25 |
| 6,239,583 B1 * | 5/2001 | Lindbery et al. | .............. | 322/46 |
| 6,281,664 B1 * | 8/2001 | Nakamura et al. | ............. | 322/22 |
| 6,346,797 B1 * | 2/2002 | Perreault et al. | ............... | 322/29 |
| 6,628,104 B2 | 9/2003 | Yao et al. | | |
| 6,992,466 B2 | 1/2006 | Chadwick et al. | | |
| 2004/0008009 A1 * | 1/2004 | Fukaya | ........................ | 322/44 |
| 2004/0050066 A1 | 3/2004 | Keller | | |
| 2005/0046397 A1 * | 3/2005 | Peter | ........................... | 322/44 |

* cited by examiner

Primary Examiner—Julio Gonzalez Ramirez
(74) Attorney, Agent, or Firm—Norman M. Cameron

(57) ABSTRACT

An apparatus for regulating a transient response of an output signal of an electrical generator. The apparatus comprises a tapped output winding means for providing a first AC signal and a second AC signal. The first and second AC signals have respective RMS values. The RMS value of the first AC signal is greater than the RMS value of the second AC signal. An AC switching means for selecting between the first AC signal or the second AC signal, and thereby providing a switched AC signal which has a duty cycle. A rectifier means for rectifying the switched AC signal and providing a rectified DC signal. The rectified DC signal has a DC signal component, a square wave signal component and a ripple signal component. The square wave signal component has a duty cycle. The duty cycle of the square wave signal component is equal to the duty cycle of the switched AC signal. A filter means for filtering the rectified DC signal and for providing the output signal. The filter means is operable to filter the rectified DC signal by averaging the square wave component and filtering the ripple component. The AC switching means is responsive to the output signal to adjust the duty cycle of the switched AC signal to regulate the output signal.

26 Claims, 13 Drawing Sheets

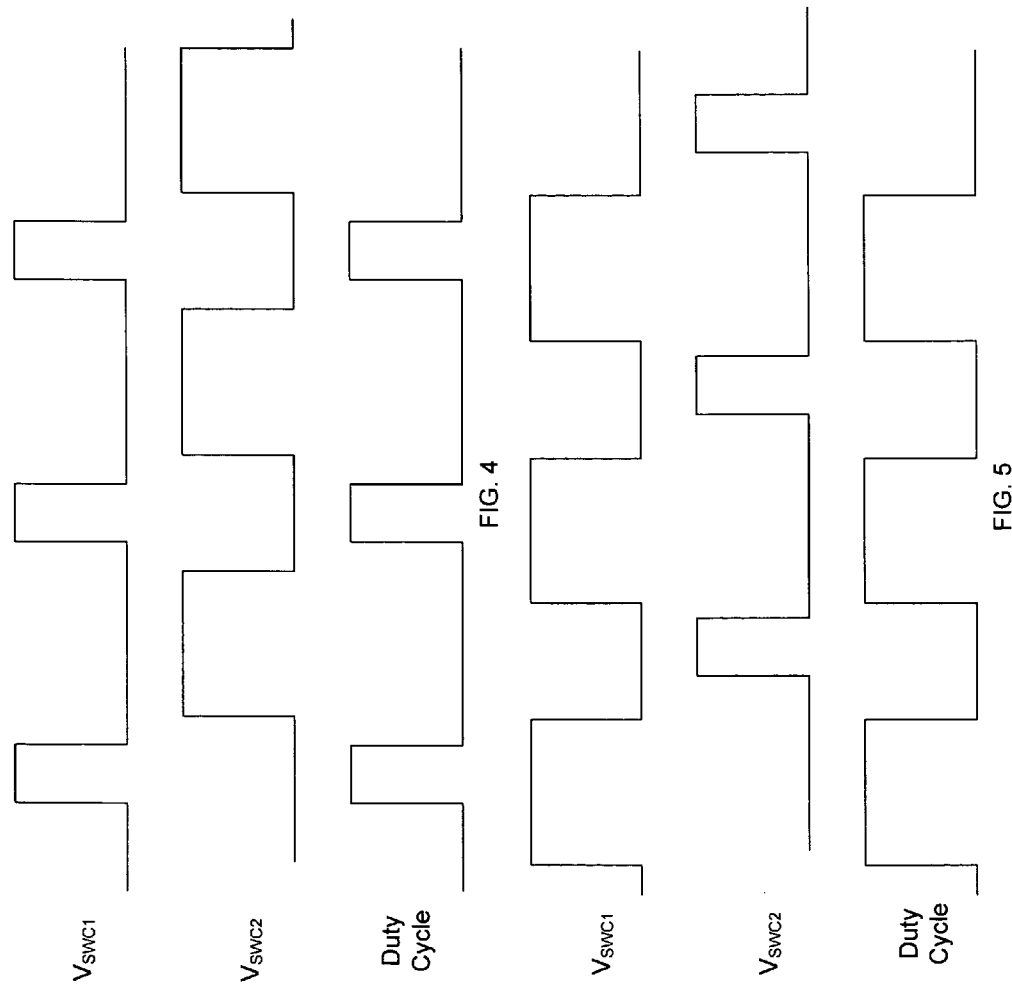

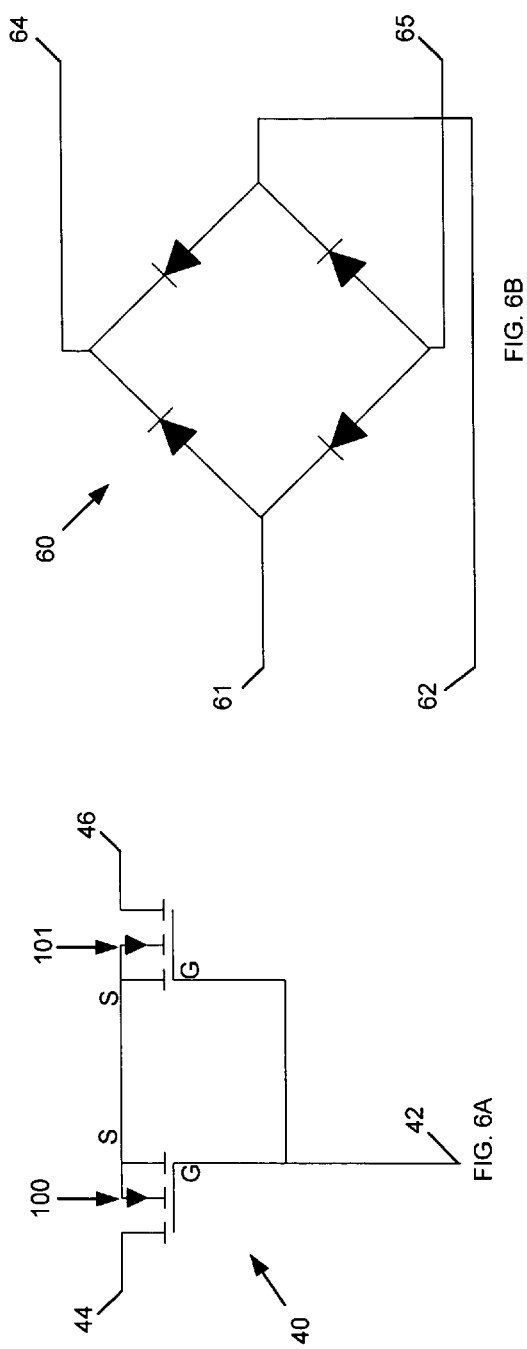

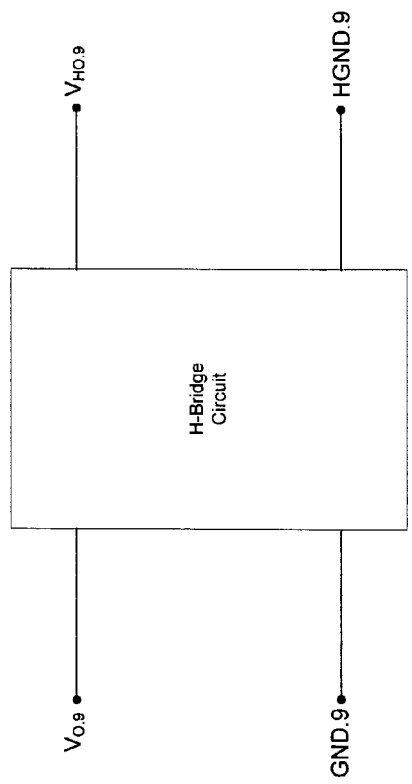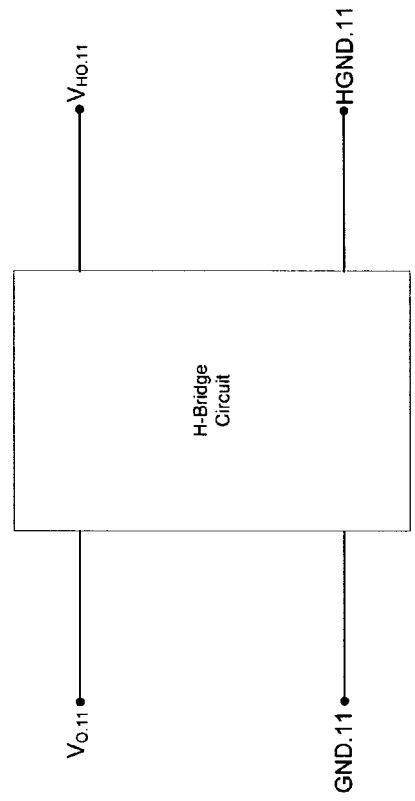

GENERATOR TRANSIENT REGULATOR

BACKGROUND OF THE INVENTION

1. Field of the Invention

This invention relates to regulating transient responses of an output signal of electric generators.

2. Description of Related Art

When a load is suddenly decreased or removed from an output of an electric generator, the output voltage typically increases during a transient response. This increase in output voltage during the transient response is due primarily to two factors. The first factor is a delayed response of an electric generator controller that regulates an exciter current, which, by flowing through an exciter winding, provides an exciter magnetic field. An amount of energy coupled by transformer action is influenced by the exciter current alone during the transient response, given that a mechanical rotating force of the generator is constant during this period. A decrease in the exciter current decreases the amount of energy coupled by transformer action. Since the exciter current does not adjust instantly after the load is decreased, the amount of energy coupled by transformer action does not adjust instantly, and energy output of the generator remains constant initially. However, the energy going to the load is decreased, and consequently the energy output tends to increase the output voltage.

The second factor is due to a quantity of stored magnetic energy that is in the exciter winding of the electric generator immediately prior to the decrease or the removal of the load. In the ideal case, if the electric generator controller responded immediately to the removal of the load by reducing an exciter current which reduces the energy coupled to the output by transformer action, there is still the quantity of stored magnetic energy in the exciter winding. The quantity of stored magnetic energy is transferred by transformer action to an armature winding, where it again increases the output voltage of the generator.

Conventional electric generators, for example a brushed generator, have the exciter winding on a rotor. During the transient response, the conventional electric generators dissipate the quantity of stored magnetic energy in the exciter winding in a resistive impedance. The quantity of stored magnetic energy of the exciter winding is diverted to the resistive impedance when an output voltage is detected as having an over-voltage situation.

However, there are situations when it is difficult to employ the resistive impedance to discharge the energy in the exciter winding. For example, when the electric generator is a brushless generator. In this situation, an exciter circuit consists of an exciter field winding on a stator, an exciter armature winding on the rotor and a generator field winding on the rotor. The generator field winding, in this case, has a quantity of stored magnetic energy that must be dissipated when the sudden change or removal of the load occurs. Since the generator field winding is on the rotor, which does not have any electrical connections to the stator, it is difficult to employ electrical circuitry for the purposes of dissipating the quantity of stored magnetic energy in the generator field winding.

Conventional brushless generators as disclosed in U.S. Pat. No. 6,628,104 by Yao, for example, provide an impedance circuit that selectively and temporarily absorbs excitation field current in the free-wheeling path of the excitation field winding to reduce voltage overshoot of the generator upon occurrence of an operating transition, such as a transition from high load to low load. In one implementation, the impedance circuit is an RC circuit, a by-pass switch is provided across the RC circuit. When excitation current in the free-wheeling path is not to be absorbed by the RC circuit, the by-pass switch is ON, thereby providing a low-impedance path for the excitation current. A by-pass driver controls the by-pass switch to change the by-pass switch from ON to OFF based on one or more detection signals, e.g., indicating a load transition or power-up, thereby introducing the impedance circuit into the free-wheeling path to effect decay of the excitation current from the generator. This solution has the disadvantage that the energy stored in the generator field winding is not absorbed by the impedance circuit, and therefore the energy in the generator field winding can cause damaging over-voltage conditions on the output of the generator.

In another situation, when the load is suddenly increased on the output of the electric generator, the output voltage typically decreases in the transient response. This decrease is primarily due to the delayed response of the electric generator controller. The increased output energy requirement is not initially provided for by the amount of energy coupled to the output by transformer action, which is primarily influenced by the exciter current. The increased load tends to sink charge from the output capacitance at a rate greater than the amount of charge sourced to the output capacitance by transformer action, and consequently the output voltage drops. Clearly, the electric generator by Yao does not offer a solution to this problem.

To solve these problems a novel method and apparatus are required that prevents the energy stored in the generator field winding from causing an over-voltage condition on the output when the load is decreased, and prevents a decrease in output voltage when the load is increased.

SUMMARY OF THE INVENTION

A first aspect of the present invention includes an apparatus for regulating a transient response of an output signal of an electrical generator. The apparatus comprises an output winding means which provides a first AC signal and a second AC signal. A switching means for combines the first AC signal and the second AC signal to provide a switched signal. A filter unit has an input and an output. The filter unit is between the switched signal and the output signal. The output of the filter unit provides the output signal. The switching means is responsive to the output signal to control the combining of the first and second AC signals to regulate the transient response of the output signal.

In a second aspect of the present invention there is a generator which provides an output signal. The generator comprises a stator and a rotor disposed about the stator. An exciter regulator is responsive to the output signal of the generator and provides an exciter field signal. The exciter regulator is connected to the stator. An exciter field coil is responsive to the exciter field signal and provides an exciter magnetic field. The exciter field coil is on the stator. An exciter armature coil is responsive to the exciter magnetic field and provides an exciter armature signal. The exciter armature coil is on the rotor. A generator field coil is responsive to the exciter armature signal and provides a generator field magnetic field. The generator field coil is on the rotor. There is also a generator armature coil means which provides a first AC signal and a second AC signal. A switching means combines the first AC signal and the second AC signal to provide a switched signal. A filter unit has an input and an output. The filter unit is between the switched signal and the output signal. The output of the filter unit provides the output signal.

In another aspect of the present invention a method is provided for regulating a transient response of an output signal of a generator. A first AC signal and a second AC signal from a generator armature winding means are provided. The first AC signal and the second AC signal are combined by a switching means in order to provide a switched signal. The switched signal is filtered in order to provide the output signal. The output signal is monitored in order to adjust the switching of the first and second AC signals to maintain the output signal at a set-point value.

An advantage of the present invention is the avoidance of using expensive and bulky conventional filtering components such as inductors and capacitors. This is increasingly true at higher power levels when the generator producing the power is usually slower in it's transient response time. The burden to filter the DC voltage in the transient response in conventional generators, until the generator can compensate for the load change, is one which requires massive inductors and capacitors.

Another advantage of the present invention is that the voltage ratings of the AC switch and DC switch, which typically comprise MOSFET devices, need only be the difference between the first and second AC signals and first and second DC signals respectively, which are substantially less than the respective peak AC and DC values. This permits a significant cost savings, size reduction, and boosts efficiency because power MOSFET development and cost reductions have focused more on lower voltage type devices, which inherently are able to carry higher values of current with minimal power loss. These lower voltage type MOSFET devices make use of low cost high volume assembly and packaging techniques, as opposed to devices rated for both high voltage and high current which are typically packaged as more specialized power modules that are substantially more costly to purchase and often require large amounts of manual labor.

Additionally, the use of conventional switch-mode AC-DC power convertors are still relatively expensive and highly specialized to design compared to the present invention.

BRIEF DESCRIPTION OF THE DRAWINGS

The present invention will be more readily understood from the following description of preferred embodiments thereof given, by way of example, with reference to the accompanying drawings, in which:

FIG. 4 are waveform diagrams of the signals in FIG. 3 during a decrease in a load;

FIG. 5 are waveform diagrams of the signals in FIG. 3 during an increase in a load;

FIGS. 6A, 6B and 6C are schematic views of circuit elements of FIG. 2;

FIG. 12 is a schematic view of an H-bridge circuit connected to the output of FIG. 9;

FIG. 13 is a schematic view of an H-bridge circuit connected to the output of FIG. 11;

DETAILED DESCRIPTION OF THE PREFERRED EMBODIMENTS

Figure 1:
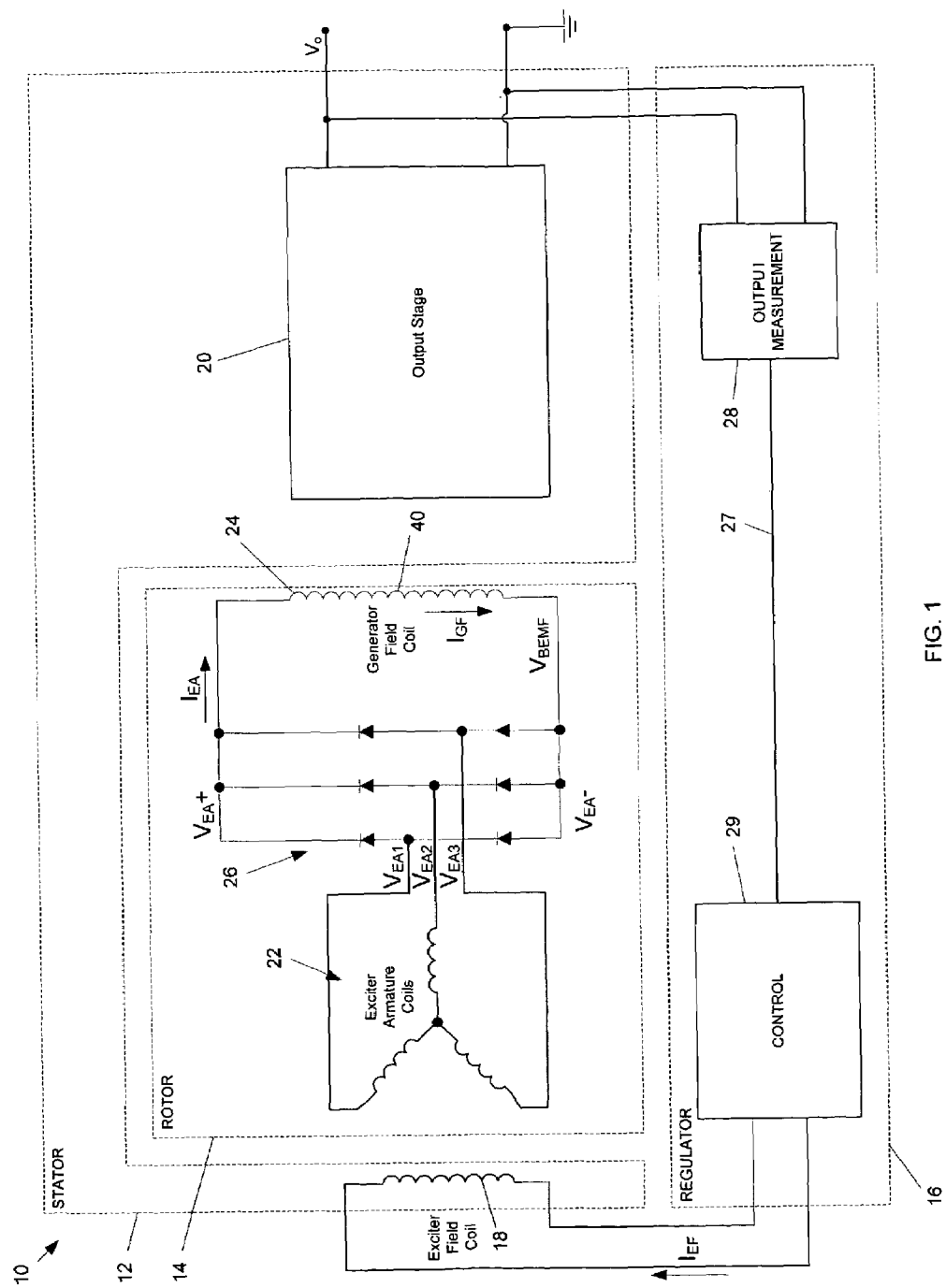
FIG. 1 is a schematic view of a brushless generator.

The operation and structure of a brushless generator can be understood by referring first to FIG. 1. A brushless generator indicated generally by reference numeral 10 includes a stator 12, a rotor 14 and a regulator 16. The stator 12 is stationary and includes an exciter field coil 18 and an output stage 20. The output stage conventionally contains a generator armature coil assembly, a rectifier unit and a filter unit. The rotor 14 is rotated by an external mechanical force, such as an engine or some accessory thereof, and includes an exciter armature coil assembly indicated generally by reference numeral 22 and a generator field coil 24.

In operation, the exciter field coil 18 is excited by an exciter field current $I_{EF}$ from the regulator 16 producing an exciter magnetic field. The exciter armature coil assembly 22 rotates through the exciter magnetic field and consequently a 3-phase exciter armature signal $V_{EA1}$, $V_{EA2}$ and $V_{EA3}$ is induced in the assembly. The induced 3-phase exciter armature signal $V_{EA1}$, $V_{EA2}$ and $V_{EA3}$ is rectified by a bridge rectifier assembly indicated generally by reference numeral 26 which provides a DC exciter armature voltage $V_{EA}$ and a DC exciter armature current $I_{EA}$.

The generator field coil 24 is excited by the DC exciter armature current $I_{EA}$ producing a generator field magnetic field. The generator field magnetic field modulates in time and space since the generator field coil 24 is on the rotor 14 which rotates. The output stage is responsive to the generator field magnetic field and provides an output voltage $V_o$. For a conventional brushless generator, the structure of the output stage includes the generator armature coil assembly, the rectifier unit and the filter unit.

The regulator 16 has an output measurement unit 28, for example an operational amplifier and pulse width modulated optocoupler, and a control unit 29, for example a PID controller. The output measurement unit 28 provides an output sample signal 27, representative of the output voltage $V_O$, or an output current in other embodiments, to the control unit 29. The control unit 29 is responsive to the output sample signal 27 and serves to adjust the exciter field current $I_{EF}$ so as to maintain the output voltage $V_O$ at a set-point value.

Figure 2:
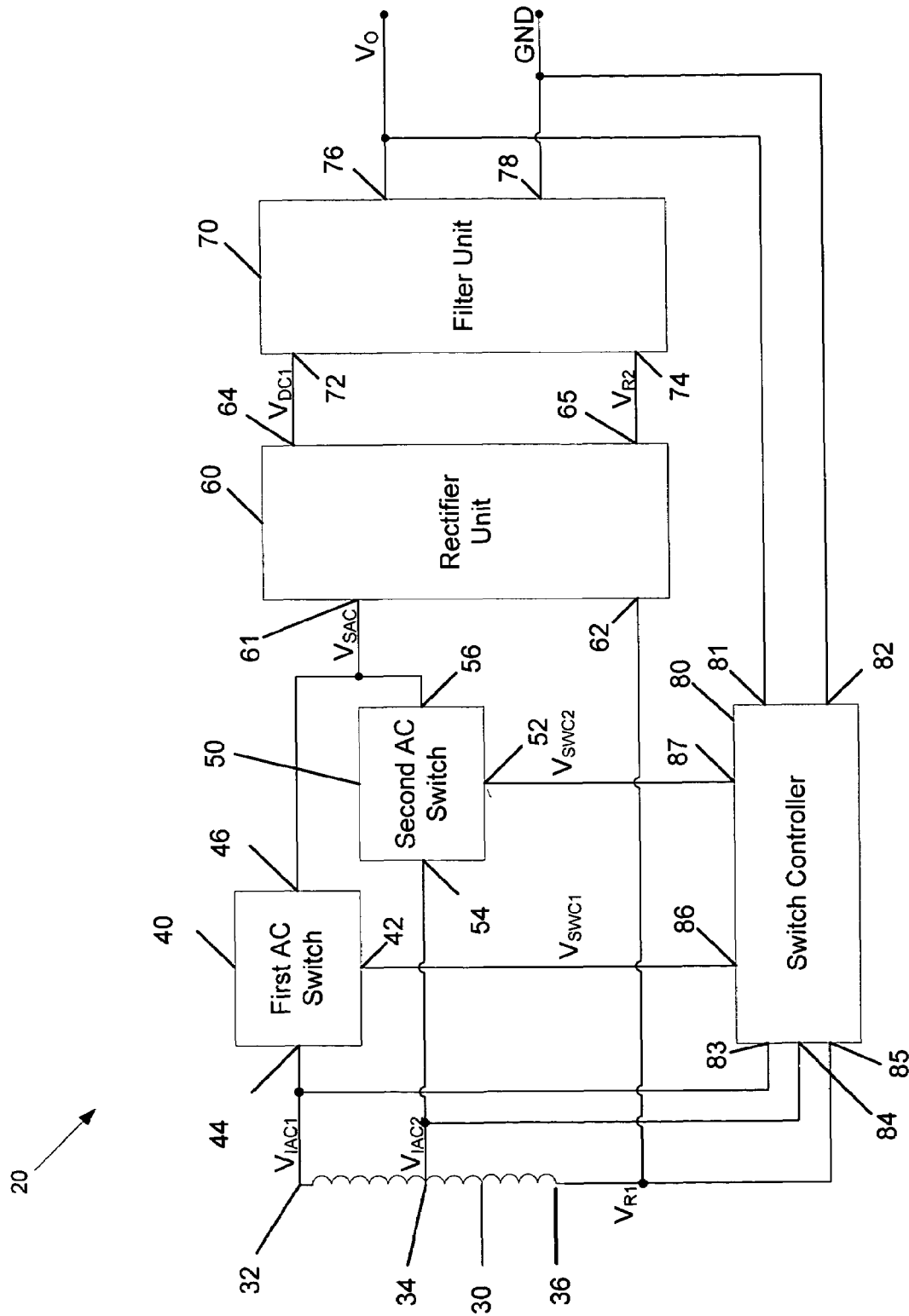
FIG. 2 is a schematic view of an output stage in FIG. 1 for a first embodiment of the invention.

In a preferred embodiment of the present invention, the output stage 20 has a structure as illustrated in FIG. 2. A generator armature coil 30 has a first tap terminal 32, a second tap terminal 34 and an end terminal 36. The terminals are electrical connections as shown in the drawings. The first tap terminal 32 provides first induced AC signal $V_{IAC1}$ with respect to the end terminal 36, and the second tap terminal 34 provides a second induced AC signal $V_{IAC2}$, also wit respect to the end terminal. The end terminal 36 provides a first reference voltage $V_{R1}$.

The first induced AC signal $V_{IAC1}$ has a first RMS value and the second induced AC signal $V_{IAC2}$ has a second RMS value. In the present embodiment, the first RMS value is greater than the second RMS value.

A first AC switch 40 has a first control terminal 42, a first switch terminal 44 and a second switch terminal 46. The first switch terminal 44 receives the first induced AC signal $V_{IAC1}$. The second switch terminal 46 can provide a switched AC signal $V_{SAC}$.

A second AC switch 50 has a second control terminal 52, a third switch terminal 54 and a fourth switch terminal 56. The third switch terminal 54 receives the second induced AC signal $V_{IAC2}$. The fourth switch terminal 56 can also provide the switched AC signal $V_{SAC}$.

A rectifier unit 60 has a first input terminal 61 and a second input terminal 62. The first input terminal 61 receives the switched AC signal $V_{SAC}$. The second input terminal 62 receives the first reference voltage $V_{R1}$. The rectifier unit 60 further includes a first output terminal 64, which provides a first DC voltage $V_{DC1}$, and a second output terminal 65, which provides a second reference voltage $V_{R2}$.

A filter unit 70 has a first input terminal 72, which receives the first DC voltage $V_{DC1}$, a second input terminal 74, which receives the second reference voltage $V_{R2}$, a first output terminal 76, which provides the output voltage $V_O$, and a second output terminal 78, which provides a ground reference GND for the output voltage $V_O$.

A switch controller 80 has a first DC input terminal 81, which receives the output signal $V_O$, a second DC input terminal 82, which receives the ground reference GND, a first AC input terminal 83, which receives the first induced AC signal $V_{IAC1}$, a second AC input terminal 84, which receives the second induced AC signal $V_{IAC2}$, and an AC reference input terminal 85 which receives the first reference signal $V_{R1}$. The switch controller 80 further includes a first output terminal 86, which provides a first switch control signal $V_{SWC1}$, and a second output terminal 87, which provides a second switch control signal $V_{SWC2}$.

The first control terminal 42 of the first AC switch 40 receives the first switch control signal $V_{SWC1}$, provided by the switch controller 80. Similarly, the second control terminal 52 of the second AC switch 50 receives the second switch control signal $V_{SWC2}$, also provided by the switch controller 80.

In operation, the generator armature coil 30 couples energy from the generator field winding 24, as shown in FIG. 1, by linking a modulating flux of the generator field magnetic field and thereby inducing the first and second induced AC signals, $V_{IAC1}$ and $V_{IAC2}$ respectively.

The switched AC signal $V_{SAC}$ signal alternates between the first induced AC signal $V_{IAC1}$ and the second induced AC signal $V_{IAC2}$. This alternation is provided by the switch controller 80 consecutively enabling and disabling the first AC switch 40 and then the second AC switch 50. The switch controller 80 does not allow both the first AC switch 40 and the second AC switch 50 to be enabled simultaneously.

The first AC switch 40 is enabled when the switch controller 80 asserts the first switch control signal $V_{SWC1}$. When the first AC switch 40 is enabled the first switch terminal 44 is shorted to the second switch terminal 46, and consequently the switched AC signal $V_{SAC}$ equals the first induced AC signal $V_{IAC1}$.

The second AC switch 50 is enabled when the switch controller 80 asserts the second switch control signal $V_{SWC2}$. When the second AC switch 50 is enabled, the third switch terminal 54 is shorted to the fourth switch terminal 56, and consequently the switched AC signal $V_{SAC}$ equals the second induced AC signal $V_{IAC2}$.

Figure 3:
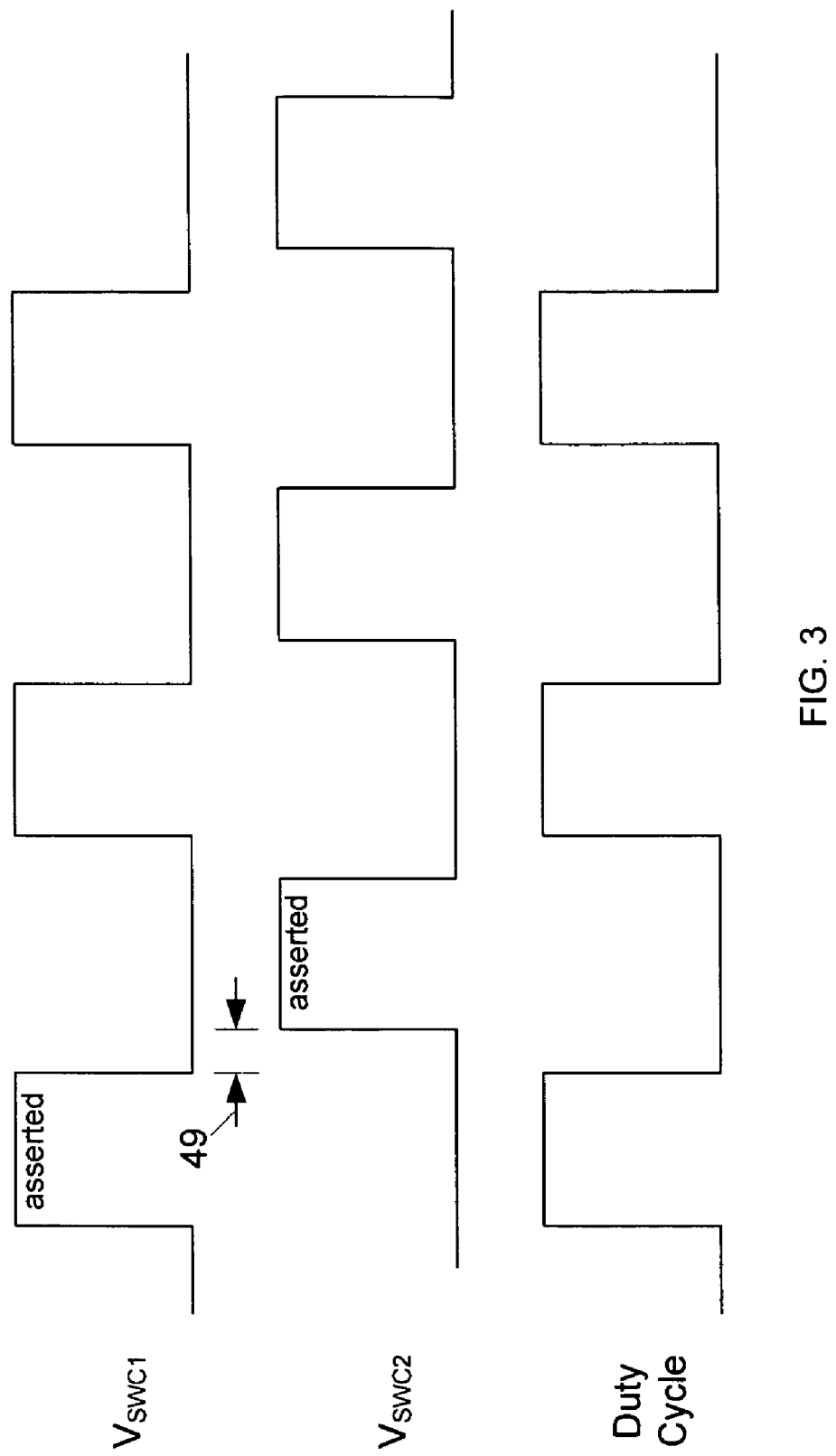
FIG. 3 are waveform diagrams of signals from FIG. 2 during normal operation.

FIG. 3 illustrates waveforms during normal operation of the first switch control signal $V_{SWC1}$, the second switch control signal $V_{SWC2}$ and a duty cycle of the switched AC signal $V_{SAC}$. The duty cycle of the switched AC signal $V_{SAC}$ is defined by the percentage of time the switched AC signal $V_{SAC}$ equals the first induced AC signal $V_{IAC1}$. Note that the waveforms of the first and second switch control signals $V_{SWC1}$ and $V_{SWC2}$ have a break-before-make dead space 49. This prevents the shorting of the first tap terminal 32 with the second tap terminal 34.

Referring back to FIG. 2, the rectifier unit 60 rectifies the switched AC signal $V_{SAC}$ and provides the first DC voltage $V_{DC1}$. The first DC voltage $V_{DC1}$ is a composite voltage comprising a composite DC voltage, a composite square wave voltage and a composite ripple voltage. The composite square wave voltage has a composite duty cycle which is identical to the duty cycle of the switched AC voltage $V_{SAC}$. The composite DC voltage and the composite ripple voltage are inherent in the rectification of the switched AC voltage $V_{SAC}$. The composite square wave voltage is a result of the alternating nature of the switched AC voltage $V_{SAC}$. The filter unit 70 serves to low pass filter the composite ripple voltage and the composite square wave voltage of the first DC voltage $V_{DC1}$, and provides the output voltage $V_O$. In this example, the filter unit 60 provides the output voltage $V_o$ that is essentially equivalent to the sum of the composite DC voltage, an average value of the composite square wave voltage and a reduced amount of the composite ripple voltage. The output voltage $V_O$ is consequently applied to the load.

The transient condition is next considered when the load is decreased. As discussed above, in the case for the conventional brushless generator illustrated in FIG. 1, the output voltage would tend to increase because of the delayed response of the controller 29 and the quantity of stored magnetic energy 40 in the generator field coil 24. In the present embodiment of the output stage 20, illustrated in FIG. 2, the switch controller 80 detects that the output voltage $V_O$ increases, and accordingly decreases the duty cycle of the switched AC voltage $V_{SAC}$. By decreasing the duty cycle, the percentage of time the switched AC voltage $V_{SAC}$ equals the first induced AC signal $V_{IAC1}$ decreases, and consequently the percentage of time the switched AC voltage equals the second induced AC signal $V_{IAC2}$ increases. This is illustrated by the waveforms of the first and second switch control signals $V_{SWC1}$ and $V_{SWC2}$ respectively and the duty cycle of the switched AC voltage $V_{SAC}$ in FIG. 4.

The decrease in duty cycle of the switched AC voltage $V_{SAC}$ affects the first DC voltage $V_{DC1}$ by correspondingly decreasing the composite duty cycle of the composite square wave to match the duty cycle of the switched AC voltage $V_{SAC}$. By decreasing the composite duty cycle the average value of the composite square wave also decreases. Therefore, the output voltage $V_O$ decreases accordingly since it is the sum of the composite DC voltage, the average value of the composite square wave, and a reduced amount of composite ripple voltage. In summary, a decreased load causing an increase in output voltage $V_O$ leads to a decrease in the output voltage $V_O$ by operation of the circuit of the present embodiment.

In a case where an amount of load decreased is sufficient to cause the output voltage to increase regardless of how much the duty cycle of the switched AC voltage $V_{SAC}$ is decreased, the switch controller 80 can temporarily disable both the first AC switch 40 and the second AC switch 50. This will sink charge from the output capacitance of the generator, and prevent charge from being sourced to the output capacitance, which consequently decreases the output voltage. The switch controller can also, periodically, enable either one of the first or second AC switches, 40 or 50 respectively, to source charge to the output capacitance in order to regulate the output voltage at the set-point value.

The transient condition is now considered when the load is increased. In this case for the brushless generator illustrated in FIG. 1, the output voltage would tend to decrease because of the delayed response of the controller 29. In the present embodiment, the switch controller 80 illustrated in FIG. 2 detects that the output voltage $V_O$ decreases, and accordingly increases the duty cycle of the switched AC voltage $V_{SAC}$. By increasing the duty cycle, the percentage of time the switched AC voltage $V_{SAC}$ equals the first induced AC signal $V_{IAC1}$ increases, and consequently the percentage of time the switched AC voltage equals the second induced AC signal $V_{IAC2}$ decreases. This is illustrated by the waveforms of the first and second switch control signals $V_{SWC1}$ and $V_{SWC2}$ respectively and the duty cycle of the switched AC voltage $V_{SAC}$ in FIG. 5.

The increase in duty cycle of the switched AC voltage $V_{SAC}$ affects the first DC voltage $V_{DC1}$ by correspondingly increasing the composite duty cycle of the composite square wave to match the duty cycle of the switched AC voltage $V_{SAC}$. By increasing the composite duty cycle the average value of the composite square wave also increases. Therefore, the output voltage $V_O$ will tend to increase since it is the sum of the composite DC voltage, the average value of the composite square wave, and a reduced amount of composite ripple voltage. In summary, an increased load causing a decrease in output voltage $V_O$ leads to an increase in the output voltage $V_O$ by operation of the circuit of the present embodiment.

In a case where an amount of load increased is sufficient to cause the output voltage to decrease regardless of how much the duty cycle of the switched AC voltage $V_{SAC}$ is increased, the switch controller 80 can temporarily continuously enable the first switch 40. This will source the maximum amount of charge to the output capacitance of the generator.

The first and second AC switches, 40 and 50 respectively, have a structure illustrated in FIG. 6A for this particular embodiment. Two n-channel MOSFETs, indicated generally by reference numerals 100 and 101 respectively, have respective sources S connected together and respective gates G connected together. Alternative embodiments could use other types of AC switches, such as a pair of p-channel MOSFETs.

The rectifier unit 60 in this example is a bridge rectifier, which is commonly known in the art, and is illustrated in FIG. 6B. The filter unit 70, in its simplest form, can be a capacitor as illustrated in FIG. 6C.

The present embodiment can be adapted to provide an AC output voltage by not including the rectifier unit 60. In this case, the first input terminal 72 of the filter unit 70 receives the switched AC voltage $V_{SAC}$ directly, and the second input terminal 74 receives the first reference voltage $V_{R1}$. The operation is similar in principle to the previously described embodiment in that the duty cycle of the switched AC voltage $V_{SAC}$ is varied so that the averaging effect of the filter unit 70 on the switched AC voltage varies the output voltage $V_O$ accordingly. Note that the first DC input terminal 81 of the controller 80 is also adapted to receive and monitor the AC output voltage.

Figure 7:
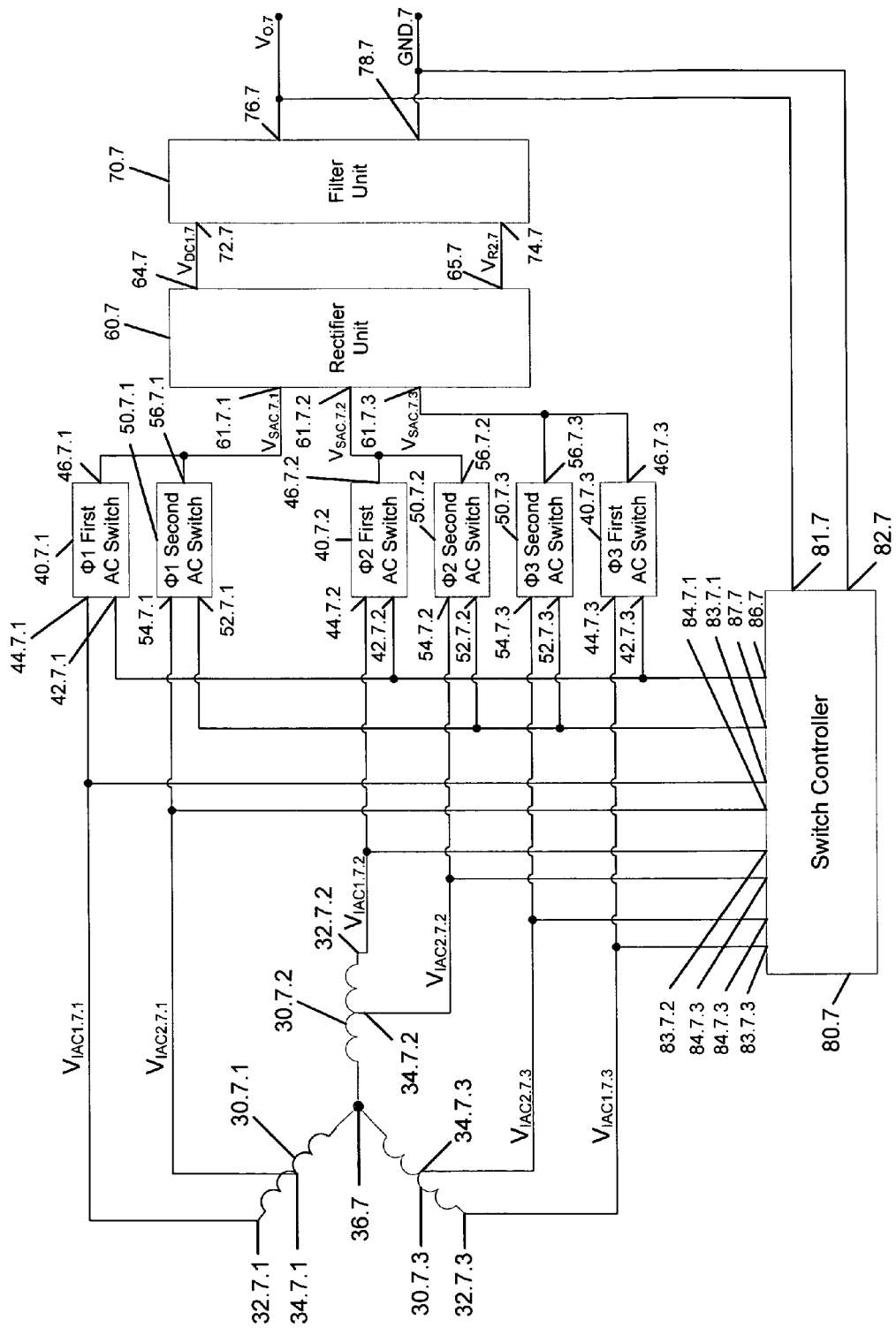
FIG. 7 is a schematic view of the output stage in FIG. 1 for another embodiment of the invention.

A second embodiment of the invention is illustrated in FIG. 7 wherein like elements to the previous embodiment have like reference numerals with an additional suffix "0.7". This embodiment is a 3-phase version of the previously described single-phase embodiment. Like elements of each phase of the embodiment illustrated in FIG. 7 have like reference numerals with an additional suffix ".x", wherein x denotes the phase and is either 1, 2 or 3.

Figure 8:
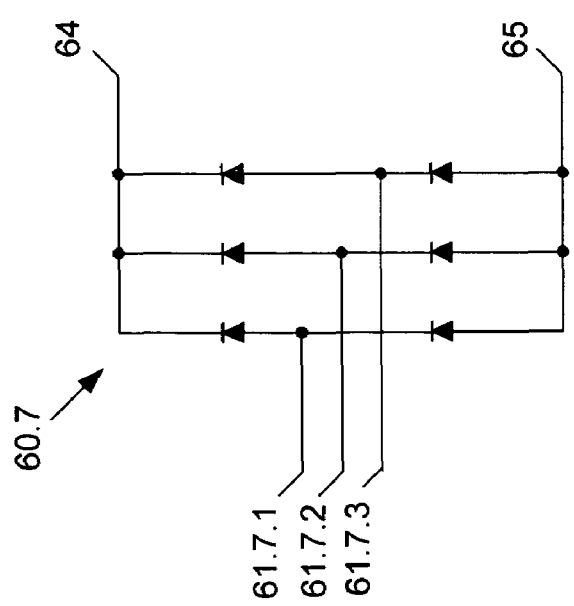
FIG. 8 is a schematic view of a rectifier circuit of FIG. 7.

The operation of this embodiment is similar to the single-phase embodiment. A notable difference is a rectifier unit 60.7 that is responsive to three switched AC voltages $V_{SAC7.1}$, $V_{SAC7.2}$ and $V_{SAC7.3}$ and provides a first DC voltage $V_{DC1.7}$ and a reference voltage $V_{R2.7}$. The rectifier unit can have a structure as illustrated in FIG. 8. The first and second AC switches of each phase can have the same structure as illustrated in FIG. 6A. The filter unit can, again, simply be a capacitor.

As with the single-phase embodiment, the 3-phase present embodiment can be adapted to provide an AC output voltage, in this case a 3-phase AC output voltage, by not including the rectifier unit 60.7. In this case, the filter unit 70.7 receives and filters the first switched AC voltage $V_{SAC7.1}$, the second switched AC voltage $V_{SAC7.2}$ and the third switched AC voltage $V_{SAC7.3}$ to provide the 3-phase output voltage. The switch controller 80.7 is adapted to receive and monitor the 3-phase output voltage.

Figure 9:
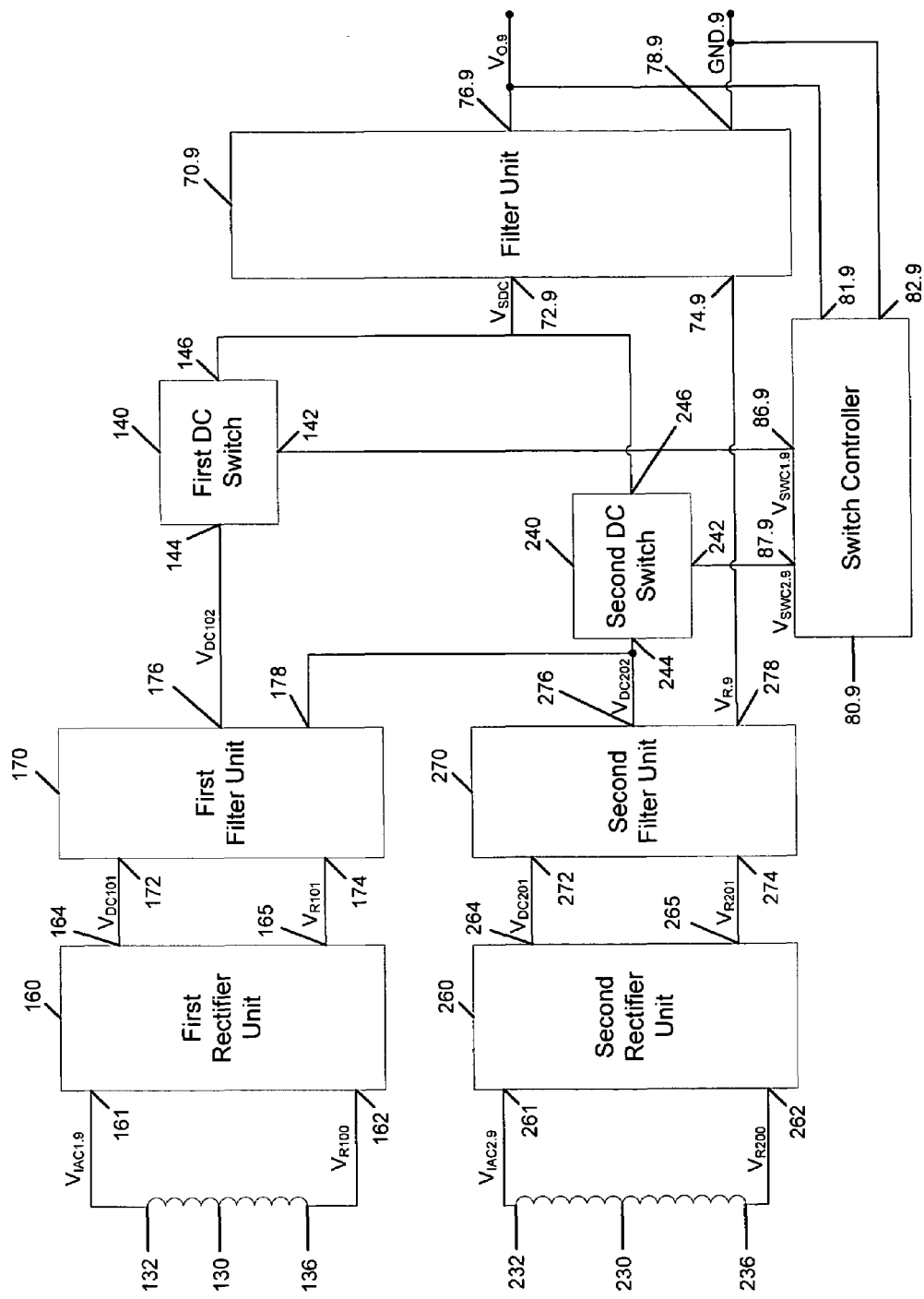
FIG. 9 is a schematic view of the output stage in FIG. 1 for a second embodiment of the invention.

Another embodiment of the invention is illustrated in FIG. 9 wherein like parts have like reference numerals with an additional suffix "0.9". A generator armature coil 130 has a first tap terminal 132 and an end terminal 136. The first tap terminal 132 provides an induced AC signal $V_{IAC1.9}$ with respect to the end terminal 136, which provides a reference voltage $V_{R100}$. Another generator armature coil 230 has a first tap terminal 232 and an end terminal 236. The first tap terminal 232 provides an induced AC signal $V_{IAC2.9}$ with respect to the end terminal 236, which provides a reference voltage $V_{R200}$.

The first induced AC signal $V_{IAC1}$ has a first RMS value and the second induced AC signal $V_{IAC2.9}$ has a second RMS value. In the present embodiment, the first RMS value is less than the second RMS value.

A rectifier unit 160 has a first input terminal 161 and a second input terminal 162. The first input terminal 161 receives the induced AC signal $V_{IAC1.9}$. The second input terminal 162 receives the reference voltage $V_{R100}$. The rectifier unit 160 further includes a first output terminal 164, which provides a DC voltage $V_{DC101}$, and a second output terminal 165, which provides a second reference voltage $V_{R101}$.

Another rectifier unit 260 has a first input terminal 261 and a second input terminal 262. The first input terminal 261 receives the induced AC signal $V_{IAC2.9}$. The second input terminal 262 receives the reference voltage $V_{R200}$. The rectifier unit 260 further includes a first output terminal 264, which provides a DC voltage $V_{DC201}$, and a second output terminal 265, which provides a second reference voltage $V_{R201}$.

A first filter unit 170 has a first input terminal 172, which receives the DC voltage $V_{DC101}$, a second input terminal 174, which receives the reference voltage $V_{R101}$, a first output terminal 176, which provides a DC voltage $V_{DC102}$, and a reference terminal 178.

A second filter unit 270 has a first input terminal 272, which receives the DC voltage $V_{DC201}$, a second input terminal 274, which receives the reference voltage $V_{R201}$ a first output terminal 276, which provides a DC voltage $V_{DC202}$, and a second output terminal 278, which provides a reference voltage $V_{R.9}$. The reference terminal 178 of the filter unit 170 receives the DC voltage $V_{DC202}$.

A first DC switch 140 has a first control terminal 142, a first switch terminal 144 and a second switch terminal 146. The first switch terminal 144 receives the DC voltage $V_{DC102}$. The second switch terminal 146 can provide a switched DC voltage $V_{SDC}$.

A second DC switch 240 has a first control terminal 242, a first switch terminal 244 and a second switch terminal 246. The first switch terminal 244 receives the DC voltage $V_{DC202}$. The second switch terminal 246 can also provide the switched DC voltage $V_{SDC}$.

A filter unit 70.9 has a first input terminal 72.9, which receives the switched DC voltage $V_{SDC}$, a second input terminal 74.9, which receives the reference voltage $V_{R.9}$, a first output terminal 76.9, which provides the output voltage $V_{O.9}$, and a second output terminal 78.9, which provides a ground reference GND.9 for the output voltage $V_{O.9}$.

A switch controller 80.9 has a first DC input terminal 81.9, which receives the output signal $V_{O.9}$, a second DC input terminal 82.9, which receives the ground reference GND.9, a first output terminal 86.9, which provides a first switch control signal $V_{SWC1.9}$, and a second output terminal 87.9, which provides a second switch control signal $V_{SWC2.9}$.

In operation, the generator armature coils 130 and 230 couple energy from the generator field winding 24, as shown in FIG. 1, by linking a modulating flux of the generator field magnetic field and thereby inducing the first and second induced AC signals, $V_{IAC1.9}$ and $V_{IAC2.9}$ respectively.

The armature coils 130 and 230 provide the induced AC signals $V_{IAC1.9}$ and $V_{IAC2.9}$ respectively, to the rectifier units 160 and 260 respectively. The rectifier units 160 and 260 rectify the induced AC signals $V_{IAC1.9}$ and $V_{IAC2.9}$ respectively, and provide the DC voltages $V_{DC101}$ and $V_{DC201}$ respectively.

The switched DC voltage $V_{SDC}$ is generated by alternating between the DC voltages $V_{DC102}$ and $V_{DC202}$. This alternation is controlled by the switch controller 80.9 consecutively enabling and disabling the first DC switch 140 and then the second DC switch 240. The switch controller 80.9 does not allow both the first DC switch 140 and the second DC switch 240 to be enabled simultaneously.

The first DC switch 140 is enabled when the switch controller 80.9 asserts the first switch control signal $V_{SWC1.9}$. When the first DC switch 140 is enabled the first switch terminal 144 is shorted to the second switch terminal 146, and consequently the switched DC voltage $V_{SDC}$ equals the DC voltage $V_{DC102}$.

Similarly, the second DC switch 240 is enabled when the switch controller 80.9 asserts the second switch control signal $V_{SWC2.9}$. When the second DC switch 240 is enabled the first switch terminal 244 is shorted to the second switch terminal 246, and consequently the switched DC voltage $V_{SDC}$ equals the DC voltage $V_{DC202}$.

The waveforms of the first and second switch control voltage $V_{SWC1.9}$ and $V_{SWC2.9}$ are similar to the corresponding waveforms in FIG. 3. A duty cycle is defined by the percentage of time the switched DC voltage $V_{SDC}$ equals the DC voltage $V_{DC102}$. Again, the waveforms of the first and second switch control voltages $V_{SWC1.9}$ and $V_{SWC2.9}$ have a break-before-make dead space. This prevents the shorting of the DC voltage $V_{DC102}$ with the DC voltage $V_{DC202}$.

Referring back to FIG. 9, the switched DC voltage $V_{SDC}$ is a composite voltage comprising a composite DC voltage, a composite square wave voltage and a composite ripple voltage. The composite square wave voltage has a composite duty cycle, which is identical to the duty cycle of the switched DC voltage $V_{SDC}$. The composite DC voltage and the composite ripple voltage are inherent in the rectification function provided by rectifier units 160 and 260 respectively. The composite square wave voltage is a result of the alternating nature of the switched DC voltage $V_{SDC}$. The filter unit 70.9 serves to low pass filter the composite ripple voltage and the composite square wave voltage of the switched DC voltage $V_{SDC}$, and provides the output voltage $V_{O.9}$. In this example, the filter unit 70.9 provides the output voltage $V_{O.9}$ that is essentially equivalent to the sum of the composite DC voltage, an average value of the composite square wave voltage and a reduced amount of the composite ripple voltage. The output voltage $V_{O.9}$ is consequently applied to the load.

In response to an increase or decrease in load, the circuit of the present embodiment operates similarly to previous embodiments by varying the duty cycle of the switched DC voltage $V_{SDC}$.

Figure 10:
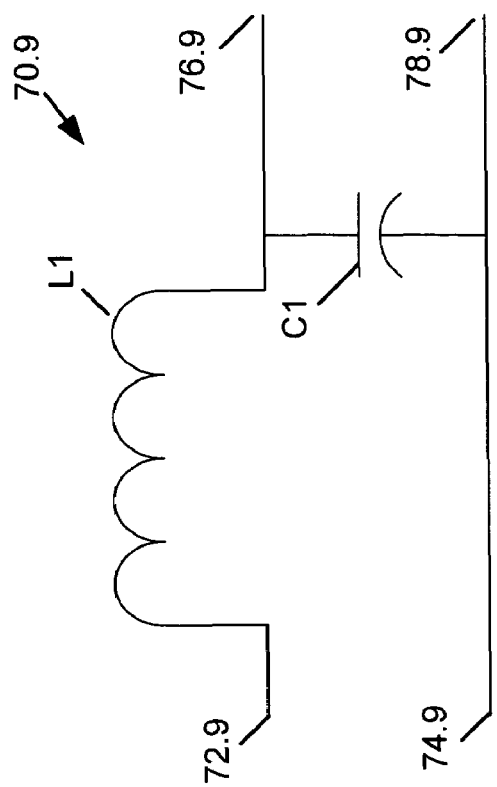
FIG. 10 is a schematic view of a filter circuit of FIG. 9.

The first and second rectifier units 160 and 260 respectively can have the structure illustrated in FIG. 6B. The first and second filter units 170 and 270 respectively can have the structure illustrated in FIG. 6C. The first and second DC switches 140 and 240 respectively are typically MOSFET transistors. The filter unit 70.9 can have the structure illustrated in FIG. 10, wherein an inductor L1 and a capacitor C1 form an LC circuit, which is commonly known the art.

An advantage of this embodiment over previous embodiments is a reduced amount of ripple voltage on the output voltage $V_{O.9}$. When the phase of the first induced AC signal $V_{IAC1.9}$ is 180 degrees out of phase with the second induced AC signal $V_{IAC2.9}$, a ripple voltage component of the DC voltage $V_{DC101}$ is cancelled by a ripple voltage component of $V_{DC201}$.

Referring to FIGS. 9 and 12, the present embodiment can be adapted to include a conventional H-bridge circuit after the filter circuit 70.9 in order to synthesize an AC output voltage $VH_{O.9}$ of any desired frequency and any peak amplitude up to the maximum voltage available from the filter circuit.

Figure 11:
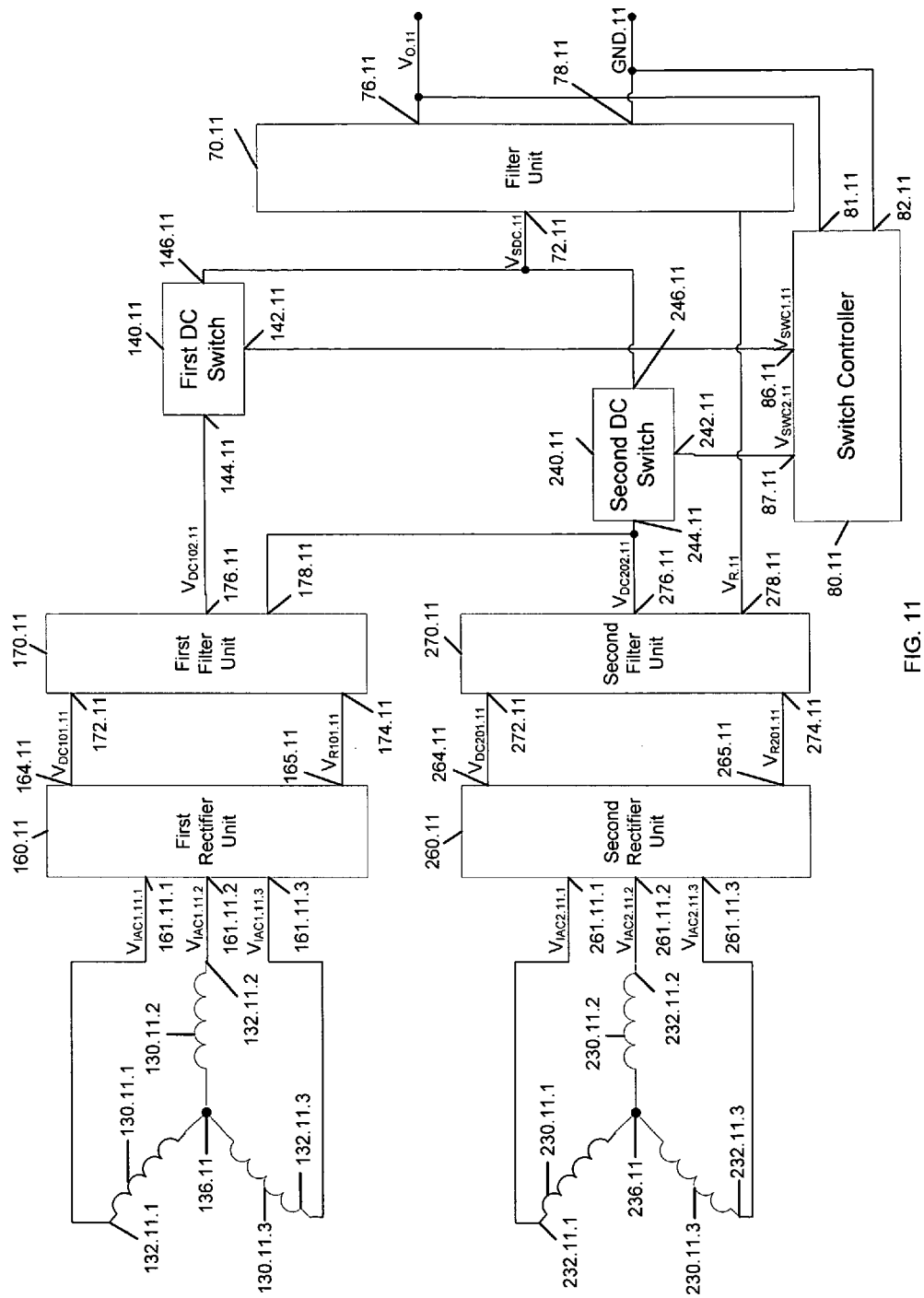
FIG. 11 is a schematic view of the output stage in FIG. 1 for a third embodiment of the invention.

Another embodiment of the invention is illustrated in FIG. 11 wherein like elements to the previous embodiments have like reference numerals with an additional suffix "0.11". This embodiment is a 3-phase version of the previous single-phase embodiment illustrated in FIG. 9. Like elements of each phase of the embodiment illustrated in FIG. 11 have like reference numerals with an additional suffix ".x", wherein x denotes the phase and can be either 1, 2 or 3.

The operation of this embodiment is essentially identical to the single-phase embodiment of FIG. 9. A notable difference is rectifier units 160.11 and 260.11 that are responsive to three induced AC signals $V_{IAC1.11.1}$, $V_{IAC1.1.2}$ and $V_{IAC1.11.3}$, and $V_{IAC2.11.1}$, $V_{IAC2.11.2}$ and $V_{IAC2.11.3}$ respectively. The rectifier units 160.11 and 260.11 can have the structure illustrated in FIG. 8.

Referring to FIGS. 11 and 13, the 3-phase embodiment can be adapted to include a conventional H-bridge circuit after the filter circuit 70.11 in order to synthesize an AC output voltage $V_{HO.11}$ of any desired frequency and any peak amplitude up to the maximum voltage available from the filter circuit.

An advantage of the previously described embodiments, and of the invention in general, is the avoidance of using expensive and bulky conventional filtering components such as inductors and capacitors. This is increasingly true at higher power levels when the generator producing the power is usually slower in its transient response time. The burden to filter the DC voltage in the transient response in conventional generators, until the generator can compensate for the load change, is one which requires massive inductors and capacitors.

Additionally, the use of conventional switch-mode AC-DC power convertors is still relatively expensive and highly specialized to design compared to the embodiments of the present invention.

The embodiment of FIG. 9 has distinct advantages over the other embodiments. Not only does it enhance DC output transient response, but it also provides a smaller, simpler generator than the embodiment of FIG. 11, and it greatly filters away AC ripple of rectified single-phase AC compared to all the other embodiments.

Figure 14:
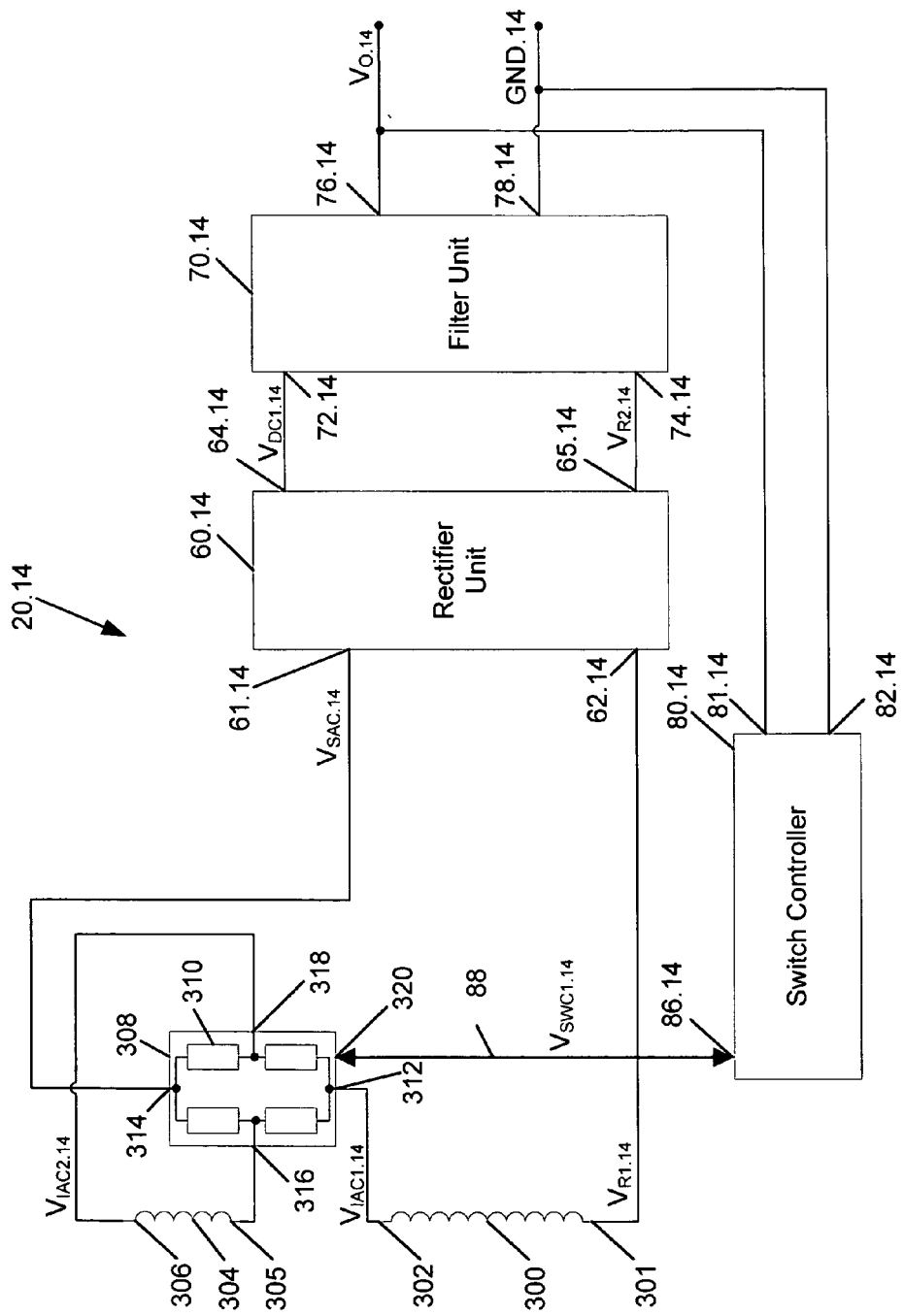
FIG. 14 is a schematic view of an output stage in FIG. 1 according to a fourth embodiment of the invention.

In another embodiment of the present invention, the output stage has a structure as illustrated in FIG. 14, wherein like parts have like reference numerals with an additional suffix "0.14". This embodiment is similar to the first embodiment of FIG. 2, the differences being described below. This embodiment has a filter unit 70.14, a switch controller 80.14 and a rectifier unit 60.14 as in the embodiment of FIG. 2, in other examples the rectifier unit is not required. When the rectifier unit 60.14 is included then an output voltage $V_{O.14}$ is a DC voltage. If it is not included then the output voltage $V_{O.14}$ is an AC voltage.

A first generator armature coil 300 has a first terminal 301 and a second terminal 302. The first terminal 301 is a reference and the second terminal provides a first induced AC signal $V_{IAC1.14}$ with respect to the first terminal. A second generator armature coil 304 has a first terminal 305 and a second terminal 306. The first terminal 305 is a reference and the second terminal provides a second induced AC signal $V_{IAC2.14}$ with respect to the first terminal 305.

An H-bridge circuit 308 has first, second, third and fourth terminals 312, 314, 316 and 318 respectively, and an I/O port 320. The H-bridge circuit 308 has four AC switches 310, which can comprise MOSFET devices. The second terminal 302 of the first generator armature coil 300 is connected to the first terminal 312 of the circuit 308. The first terminal 305 of the second generator armature coil 304 is connected to the third terminal 316 of the circuit 308, and the second terminal 306 of the armature coil 304 is connected to the fourth terminal 318 of the circuit 308. The fourth terminal 314 of the circuit 308 is connected to a terminal 61.14 of the rectifier unit 60.14, similar to the rectifier unit in FIG. 2, and provides a switched AC signal $V_{SAC.14}$ to the terminal 61.14. The first terminal 301 of the first generator armature coil 300 is connected to a terminal 62.14 of the rectifier unit 60.14. Note that in other examples without the rectifier unit 60.14, the second terminal 314 of the H-bridge circuit 308 and the first terminal 301 of the first generator armature coil 300 are connected to terminals 72.14 and 74.14 respectively of the filter unit 70.14.

The switch controller 80.14 has an I/O port 86.14 which is connected to the I/O port 320 of the H-bridge circuit 308 by control bus 88. The switch controller outputs a switch control signal $V_{SWC1.14}$ on the control bus which operates to enable and disable the AC switches 310 such that the second induced AC signal $V_{IAC2.14}$ is either added or subtracted from the first induced AC signal $V_{IAC1.14}$. The resulting combination is the switched AC signal $V_{SAC.14}$. The switch controller 80.14 controls the adding and subtracting of the second induced AC signal $V_{IAC2.14}$ to the first induced AC signal $V_{IAC1.14}$ in order to regulate the output voltage $V_{O.14}$.

Figure 15:
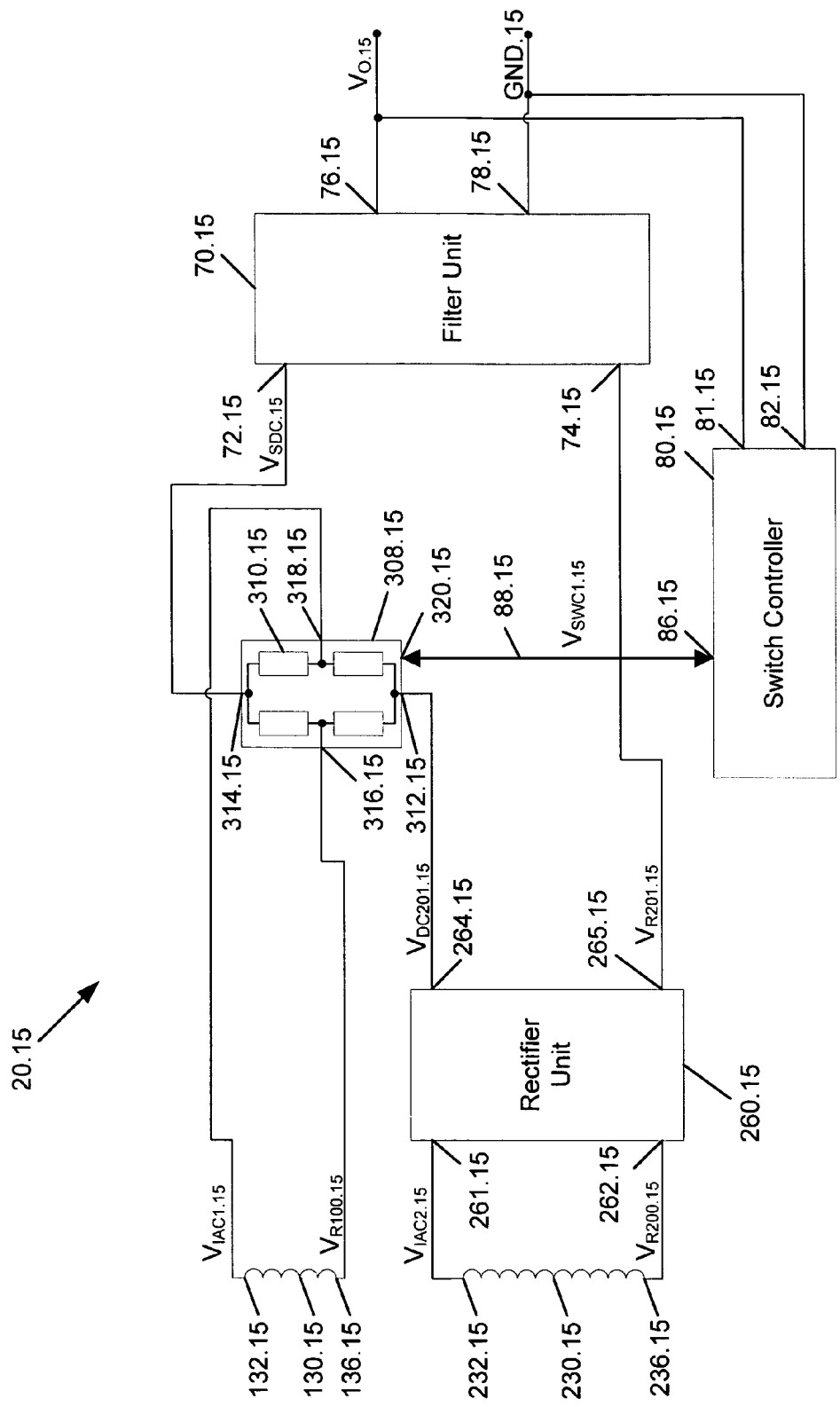
FIG. 15 is a schematic view of an output stage in FIG. 1 according to a sixth embodiment of the invention.

In another embodiment of the present invention, the output stage has a structure as illustrated in FIG. 15, wherein like parts have like reference numerals with an additional suffix "0.15". This embodiment is similar to the previous embodiment of FIG. 14 and to the embodiment of FIG. 9, the differences being described below. This embodiment has a filter unit 70.15 and a switch controller 80.15 as in the embodiment of FIG. 9. The filter unit 70.15 provides an output voltage $V_{O.15}$.

A first generator armature coil 130.15 has a first terminal 132.15 and a second terminal 136.15. The first terminal 132.15 provides an induced AC signal $V_{IAC1.15}$ with respect to the second terminal 136.15, which provides a reference voltage $V_{R100.15}$. A second generator armature coil 230.15 has a first terminal 232.15 and a second terminal 236.15. The first terminal 232.15 provides an induced AC signal $V_{IAC2.15}$ with respect to the second terminal 236.15, which provides a reference voltage $V_{R200.15}$.

A rectifier unit 260.15 has a first input terminal 261.15 and a second input terminal 262.15. The first input terminal 261.15 receives the induced AC signal $V_{IAC2.15}$. The second input terminal 262.15 receives the reference voltage $V_{R200.15}$. The rectifier unit 260.15 further includes a first output terminal 264.15, which provides a DC voltage $V_{DC201.15}$, and a second output terminal 265.15, which provides a second reference voltage $V_{R201.15}$.

An H-bridge circuit 308.15 has first, second, third and fourth terminals 312.15, 314.15, 316.15 and 318.15 respectively, and an I/O port 320.15. The H-bridge circuit 308.15 has four DC switches 310.15, which can comprise MOSFET devices. The first output terminal 264.15 of the rectifier unit 260.15 is connected to the first terminal 312.15 of the circuit 308.15. The first terminal 132.15 of the first generator armature coil 130.15 is connected to the fourth terminal 318.15 of the circuit 308.15, and the second terminal 136.15 of the armature coil 130.15 is connected to the third terminal 316.15 of the circuit 308.15. The second terminal 314.15 of the circuit 308.15 is connected to a first terminal 72.15 of the filter unit 70.14 and provides a switched DC signal $V_{SDC.15}$. The second output terminal 265.15 of the second rectifier unit 260.15 is connected to a second terminal 74.5 of the filter unit 70.15.

The switch controller 80.15 has an I/O port 86.15 which is connected to the I/O port 320.15 of the H-bridge circuit 308.15 by control bus 88.15. The switch controller receives an indication of the phase of the induced AC signal $V_{IAC1.15}$ on the control bus 88.15 and outputs a switch control signal $V_{SWC1.15}$ on the control bus which operates to enable and disable the DC switches 310.15 such that the induced AC voltage $V_{IAC1.15}$ is either added or subtracted from the DC voltage $V_{DC201.15}$. The resulting combination is the switched DC signal $V_{SDC.15}$. The switch controller 80.15 controls the adding and subtracting of the induced AC voltage $V_{IAC1.15}$ to the DC voltage $V_{DC201.15}$ in order to regulate the output voltage $V_{O.15}$. It is understood that the switch controller 80.15 toggles its control of the H-bridge circuit 308.15 on alternate AC phases such that the induced AC signal $V_{IAC1.15}$ is essentially rectified.

Figure 16:
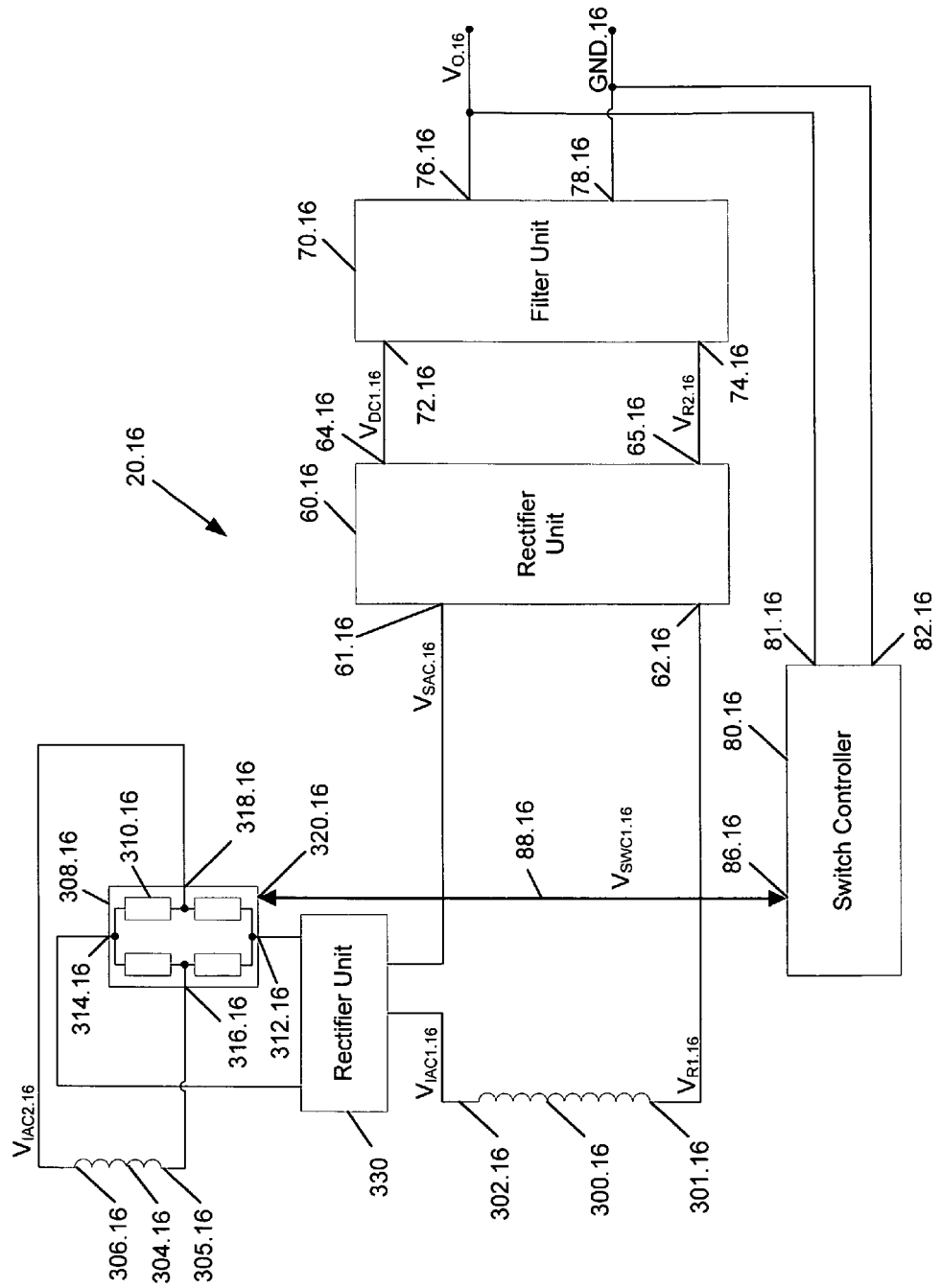
FIG. 16 is a schematic view of an output stage in FIG. 1 according to a seventh embodiment of the invention.

In another embodiment of the present invention, the output stage has a structure as illustrated in FIG. 16, wherein like parts have like reference numerals with an additional suffix "0.16". This embodiment is similar to the previous embodiments of FIG. 14 and 15, comprising a first generator armature coil 304.16 with an induced AC signal $V_{IAC2.16}$, a second generator armature coil 300.16, an H-bridge circuit 308.16 and a switch controller 80.16. A control bus 88.16 connects I/O port 320.16 of the H-bridge circuit 308.16 with I/O port 86.16 of the switch controller 80.16. In this embodiment a series rectifier 330 allows the H-bridge circuit 308.16 to comprise DC switches 310.16. The switch controller 80.15 is aware of the phase of the induced AC signal $V_{IAC2.16}$ over the control bus 88.16 in order to toggle the control polarity of switch control signal $V_{SWC1.16}$ output by the switch controller on the control bus. A rectifier unit 60.16 is optional depending on whether output voltage $V_{O.16}$ is to be DC or AC.

As will be apparent to those skilled in the art, various modifications may be made within the scope of the appended claims.

What is claimed is:

1. An apparatus for regulating a transient response of an output signal of an electrical generator, the apparatus comprising;

an output winding means for providing a first AC signal and a second AC signal, the output winding means comprising an output winding having a first tap electrical connection and a second tap electrical connection, The first tap electrical connection providing the first AC signal, the second tap electrical connection providing the second AC signal;

a switching means for combining the first AC signal and the second AC signal, thereby providing a switched signal, the switching means comprising a first AC switch, a second AC switch and a switch controller, the first AC switch having a first switch electrical connection, a second switch electrical connection and a first control electrical connection, the first switch electrical connection receiving the first AC signal, the first AC switch being operable to switch the first AC signal from the first switch electrical connection to the second switch electrical connection, the second switch electrical connection being connected to a node, the second AC switch having a third switch electrical connection, a fourth switch electrical connection and a second control electrical connection, the third switch electrical connection receiving the second AC signal, the second AC switch being operable to switch the second AC signal from the third switch electrical connection to the fourth switch electrical connection, the fourth switch electrical connection being connected to the node, the second switch electrical connection end the fourth switch electrical connection providing the switched signal, the switch controller being responsive to the output signal and providing a first switch control signal and a second switch control signal, the first AC switch being responsive to the first switch control signal received at the first control electrical connection, the second AC switch being responsive to the second switch control signal received at the second control electrical connection, the switch controller being operable to alternately close and open the first and second AC switches respectively thereby providing the switched signal, the switch controller being further operable to control a duty cycle of the switched signal to regulate the transient response of the output signal; and a filter unit having an input and an output, the input of the filter unit being responsive to the switched signal and the output of the filter unit providing the output signal, the switching means being responsive to the output signal to control the combining of the first and second AC signals to regulate the transient response of the output signal.

2. The apparatus as claimed in claim 1, wherein the input of the filter unit receives the switched AC signal, the output signal being an AC signal.

3. The apparatus as claimed in claim 1, wherein the apparatus further includes a rectifier unit having an input and an output, the input being connected to the second switch electrical connection of the first AC switch and the fourth switch electrical connection of the second AC switch, the input receiving the switched signal, the output of the rectifier unit providing a rectified DC signal, the rectified DC signal having a DC signal component, a square wave signal component and a ripple signal component, the square wave signal component having a duty cycle, the duty cycle of the square wave signal component being equal to the duty cycle of the switched signal, the input of the filter unit receiving the rectified DC signal, the output signal being a DC signal.

4. The apparatus as claimed in claim 1, wherein the first AC switch comprises a first MOSFET transistor and a second MOSFET transistor.

5. The apparatus as claimed in claim 1, wherein the filter unit is a capacitor.

6. The apparatus as claimed in claim 1, wherein the switch controller includes a microcontroller.

7. The apparatus as claimed in claim 3, wherein the rectifier unit includes a diode.

8. The apparatus as claimed in claim 3, wherein the rectifier unit includes a bridge rectifier.

9. An apparatus for regulating a transient response of an output signal of an electrical generator, the apparatus comprising;

an output winding means for providing a first AC signal and a second AC signal, the output winding means comprising a first output winding having a first electrical connection and a second electrical connection and a second output winding having a third electrical connection and a fourth electrical connection, the first output winding providing the first AC signal, the second output winding providing the second AC signal;

a switching means for combining the first AC signal and the second AC signal, thereby providing a switched signal, the switching means comprising an H-bridge circuit and a switch controller, the H-bridge circuit having a fifth electrical connection, a sixth electrical connection, a seventh electrical connection, an eighth electrical connection and a ninth electrical connection the third and fourth electrical connections of the second output winding being connected to the seventh and eighth electrical connections respectively of the H-bridge circuit, the filter unit being responsive to the sixth electrical connection of the FT-bridge circuit and to the second electrical connection of the first output winding, the fifth electrical connection of the H-bridge circuit being responsive to the first electrical connection of the first output winding, the switch controller being responsive to the output signal and providing a switch control signal, the H-bridge circuit being responsive to the switch control signal received at the ninth electrical connection, the switch controller being operable to control the adding arid subtracting of the second AC signal with the first AC signal; and a filter unit having an input and an output, the input of the filter unit being responsive to the switched signal and the output of the filter unit providing the output signal, the switching means being responsive to the output signal to control the combining of the first and second AC signals to regulate the transient response of the output signal.

10. The apparatus of claim 9, wherein the first electrical connection of the first output winding is connected to the fifth electrical connection of the H-bridge circuit.

11. The apparatus of claim 10, wherein the sixth electrical connection of the H-bridge circuit is connected to the filter input.

12. The apparatus of claim 10, wherein the apparatus farther includes a rectifier unit having an input and an output, the sixth electrical connection of the H-bridge circuit and the second terminal electrical connection of the first output winding being connected to the input of the rectifier unit, the output of the rectifier unit being connected to the input of the filter unit.

13. The apparatus of claim 9, wherein the apparatus farther includes a first rectifier unit having a first input electrical connection, a second input electrical connection, a first output electrical connection and a second output connection, the first electrical connection of the first output winding being connected to the first input electrical connection of the first rectifier unit, the fifth electrical connection of the H-bridge circuit being connected to the second input electrical connection of the first rectifier unit, the first output electrical connection of the first rectifier unit being connected to the sixth electrical connection of the H-bridge circuit, the filter unit being responsive to the second output electrical connection of the first rectifier unit.

14. The apparatus of claim 13, wherein the second output electrical connection of the first rectifier unit and the second electrical connection of the first output winding are connected to the input of the filter unit.

15. The apparatus of claim 13, wherein the apparatus further includes a second rectifier unit having an input and an output the second output electrical connection of the first rectifier unit and the second electrical connection of the first output winding being connected to the input of the second rectifier unit, the output of the rectifier unit being connected to the input of the filter unit.

16. An apparatus for regulating a transient response of an output signal of an electrical generator, the apparatus comprising;
an output winding means for providing a first AC signal and a second AC signal, the output winding means comprising a first output winding having a first electrical connection and a second electrical connection and a second output winding having a third electrical connection and a fourth electrical connection, the first output winding providing the first AC signal, the second output winding providing the second AC signal;
a switching means for combining the first AC signal and the second AC signal, thereby providing a switched signal the switching means comprises a first rectifier unit, a second rectifier unit, a first DC switch, a second DC switch and a switch controller, the first rectifier unit being responsive to the first AC signal and providing a first DC signal, the second rectifier unit being responsive to the second AC signal and providing a second DC signal, the first DC switch having a first switch electrical connection, a second switch electrical connection and a first control electrical connection, the first switch electrical connection receiving the first DC signal, the first DC switch being operable to switch the first DC signal from the first switch electrical connection to the second switch electrical connection, the second DC switch having a third switch electrical connection, a fourth switch electrical connection and a second control electrical connection, the third switch electrical connection receiving the second DC signal, the second DC switch being operable to switch the second DC signal from the third switch electrical connection to the fourth switch electrical connection, the second switch electrical connection of the first DC switch being connected to the fourth switch electrical connection of the second DC switch, the switch controller being responsive to the output signal and providing a first switch control signal and a second switch control signal, the first DC switch being responsive to the first switch control signal received at the first control electrical connection, the second DC switch being responsive to the second switch control signal received at the second control electrical connection, the switch controller being operable to alternately close and open the first and second DC switches respectively thereby providing the switched signal, the switch signal having a square wave signal component, the switch controller being further operable to control the duty cycle of the square wave signal component to regulate the transient response of the output signal; and
a filter unit having an input and am output, the input of the filter unit being responsive to the switched signal and the output of the filter unit providing the output signal, the switching means being responsive to the output signal to control the combining of the first and second AC signals to regulate the transient response of the output signal.

17. The apparatus as claimed in claim 16, wherein the first rectifier unit includes a diode.

18. The apparatus as claimed in claim 16, wherein the first rectifier unit includes a bridge rectifier.

19. The apparatus as claimed in claim 16, wherein the second rectifier unit includes a bridge rectifier.

20. The apparatus as claimed in claim 16, wherein the first DC switch includes a MOSFET transistor.

21. The apparatus as claimed in claim 16, wherein the filter unit includes a capacitor.

22. The apparatus as claimed in claim 16, wherein the switch controller includes a microcontroller.

23. The apparatus as claimed in claim 16, wherein the apparatus further includes a post-rectification filter unit, the post-rectification filter unit filtering the first DC signal.

24. The apparatus as claimed in claim 23, wherein the post-rectification filter unit is a capacitor.

25. The apparatus as claimed in claim 16, wherein the apparatus further includes an H-bridge circuit, the H-bridge circuit receives the output signal and provides an AC signal.

26. An apparatus for regulating a transient response of an output signal of an electrical generator, the apparatus comprising;
an output winding means for providing a first AC signal and a second AC signal, the output winding means comprising a first output winding having a first electrical connection and a second electrical connection and a second output winding having a third electrical connection and a fourth electrical connection, the first output winding providing the first AC signal, the second output winding providing the second AC signal;
a switching means for combining the first AC signal and the second AC signal, thereby providing a switched signal, the switching means comprising a rectifier unit, an H-bridge circuit and a switch controller, the rectifier unit being responsive to the second AC signal and providing a DC signal, the H-bridge circuit receiving the flint AC signal and the DC signal and providing the switched signal, the switch controller being responsive to the output signal and the first AC signal and providing a switch control signal, the H-bridge circuit being responsive to the switch control signal, the switch controller being operable to control the adding and subtracting of the first AC signal with the DC signal; and a filter unit having an input and an output, the input of the filter unit being responsive to the switched signal and the output of the filter unit providing the output signal, the switching means being responsive to the output signal to control the combining of the first and second AC signals to regulate the transient response of the output signal.

* * * * *